US011423931B2

(12) United States Patent
Tzou et al.

(10) Patent No.: US 11,423,931 B2
(45) Date of Patent: Aug. 23, 2022

(54) DATA STORAGE DEVICE INTERLEAVE DRIVING SECONDARY ACTUATORS

(71) Applicant: Western Digital Technologies, Inc., San Jose, CA (US)

(72) Inventors: Kevin Tzou, San Jose, CA (US); Robert C. Reinhart, San Jose, CA (US); Hitoshi Shindo, San Jose, CA (US); Shigenori Takada, Kawasaki (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/180,806

(22) Filed: Feb. 21, 2021

(65) Prior Publication Data
US 2022/0157338 A1    May 19, 2022

Related U.S. Application Data

(60) Provisional application No. 63/113,837, filed on Nov. 14, 2020.

(51) Int. Cl.
*G11B 5/48*    (2006.01)
*G11B 5/55*    (2006.01)

(52) U.S. Cl.
CPC .......... *G11B 5/5552* (2013.01); *G11B 5/4873* (2013.01)

(58) Field of Classification Search
None
See application file for complete search history.

(56) References Cited

U.S. PATENT DOCUMENTS

| 3,305,239 | A  | * | 2/1967  | Hathaway   | G11B 17/165 |
|-----------|----|---|---------|------------|-------------|
|           |    |   |         |            | 369/231     |
| 5,060,100 | A  | * | 10/1991 | Mihara     | G11B 5/486  |
| 5,978,752 | A  | * | 11/1999 | Morris     | G05B 21/02  |
|           |    |   |         |            | 360/78.07   |
| 6,121,742 | A  | * | 9/2000  | Misso      | G11B 5/553  |
| 6,229,677 | B1 | * | 5/2001  | Hudson     | G11B 5/4813 |
| 6,437,937 | B1 | * | 8/2002  | Guo        | G11B 5/5552 |
|           |    |   |         |            | 360/78.12   |
| 6,493,176 | B1 | * | 12/2002 | Deng       | G11B 5/59666|
| 6,504,669 | B1 | * | 1/2003  | Janz       | G11B 5/483  |
| 6,600,619 | B1 |   | 7/2003  | Morris et al. |          |
| 6,697,211 | B2 |   | 2/2004  | Koganezawa |             |
| 6,778,343 | B2 | * | 8/2004  | Nunnelley  | G11B 27/36  |
| 6,972,924 | B1 |   | 12/2005 | Chen et al. |            |

(Continued)

OTHER PUBLICATIONS

International Search Report and the Written Opinion for International Application No. PCT/US2021/038159 dated Oct. 13, 2021, 9 pages.

*Primary Examiner* — Peter Vincent Agustin
(74) *Attorney, Agent, or Firm* — Patterson + Sheridan, LLP; Steven H. VerSteeg

(57) ABSTRACT

A data storage device is disclosed comprising a plurality of disks each comprising a top disk surface and a bottom disk surface, and a plurality of actuator arms each comprising a first fine actuator configured to actuate a top head over one of the top disk surfaces and a second fine actuator configured to actuate a bottom head over one of the bottom disk surfaces. A first fine driver controls the fine actuators of an even interleave of the actuator arms, and a second fine driver controls the fine actuators of an odd interleave of the actuator arms.

20 Claims, 3 Drawing Sheets

(56) References Cited

U.S. PATENT DOCUMENTS

| | | | |
|---|---|---|---|
| 8,335,049 B1* | 12/2012 | Liu | G11B 19/048 |
| | | | 360/78.05 |
| 8,947,831 B1 | 2/2015 | Ee et al. | |
| 9,437,230 B2 | 9/2016 | Hatch | |
| 10,424,328 B1* | 9/2019 | Gaertner | G11B 5/4886 |
| 10,964,345 B1 | 3/2021 | Haapala et al. | |
| 2002/0027741 A1* | 3/2002 | Koganezawa | G11B 5/5552 |
| 2002/0135924 A1* | 9/2002 | Fayeulle | G11B 5/54 |
| 2004/0016102 A1* | 1/2004 | Prater | G11B 5/5521 |
| | | | 29/603.03 |
| 2006/0280078 A1* | 12/2006 | Hanks | G11B 7/0037 |
| | | | 369/47.39 |
| 2010/0214686 A1 | 8/2010 | Higa et al. | |
| 2017/0169844 A1* | 6/2017 | Kawabe | G11B 5/5552 |
| 2019/0279675 A1* | 9/2019 | Schmidt | G11B 5/5965 |
| 2020/0020357 A1* | 1/2020 | Dunn | G11B 5/5569 |
| 2021/0124641 A1* | 4/2021 | Caldwell, Jr. | G06F 3/0689 |

* cited by examiner

DATA STORAGE DEVICE INTERLEAVE DRIVING SECONDARY ACTUATORS

CROSS REFERENCE TO RELATED APPLICATIONS

This application claims priority to U.S. Provisional Patent Application Ser. No. 63/113,837, filed on Nov. 14, 2020, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
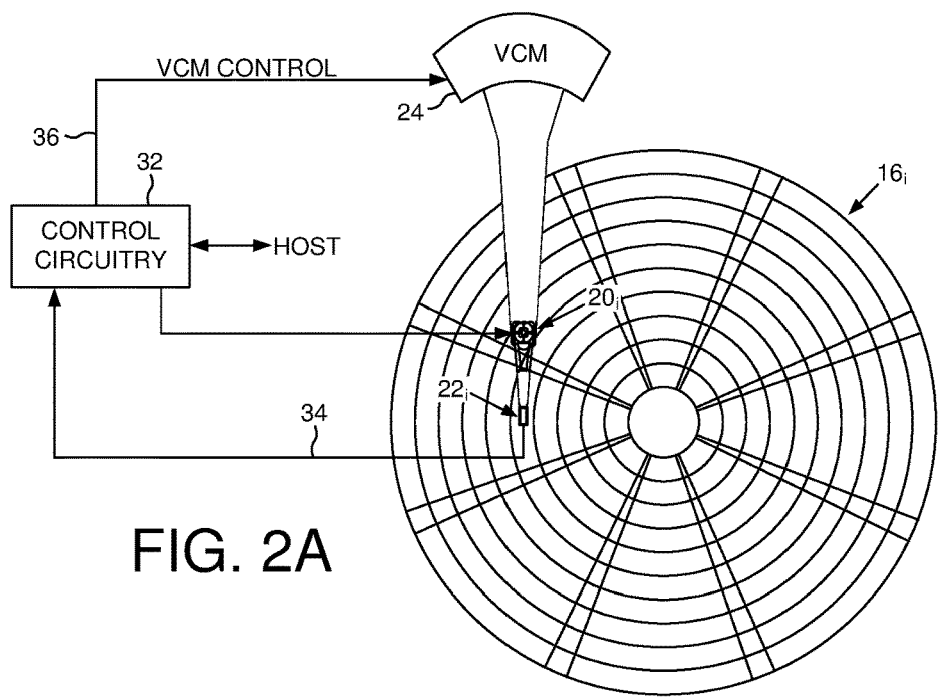
FIG. 2A shows a data storage device in the form of a disk drive according to an embodiment comprising a plurality of disks each comprising a top disk surface and a bottom disk surface.
Figure 2B:
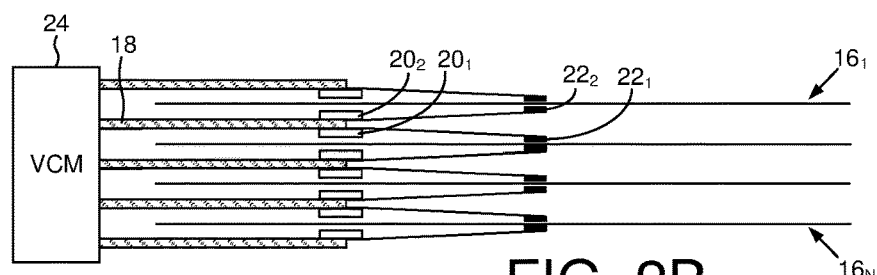
FIG. 2B shows an embodiment wherein a plurality of actuator arms each comprise a first fine actuator configured to actuate a top head over one of the top disk surfaces and a second fine actuator configured to actuate a bottom head over one of the bottom disk surfaces.
Figure 2C:
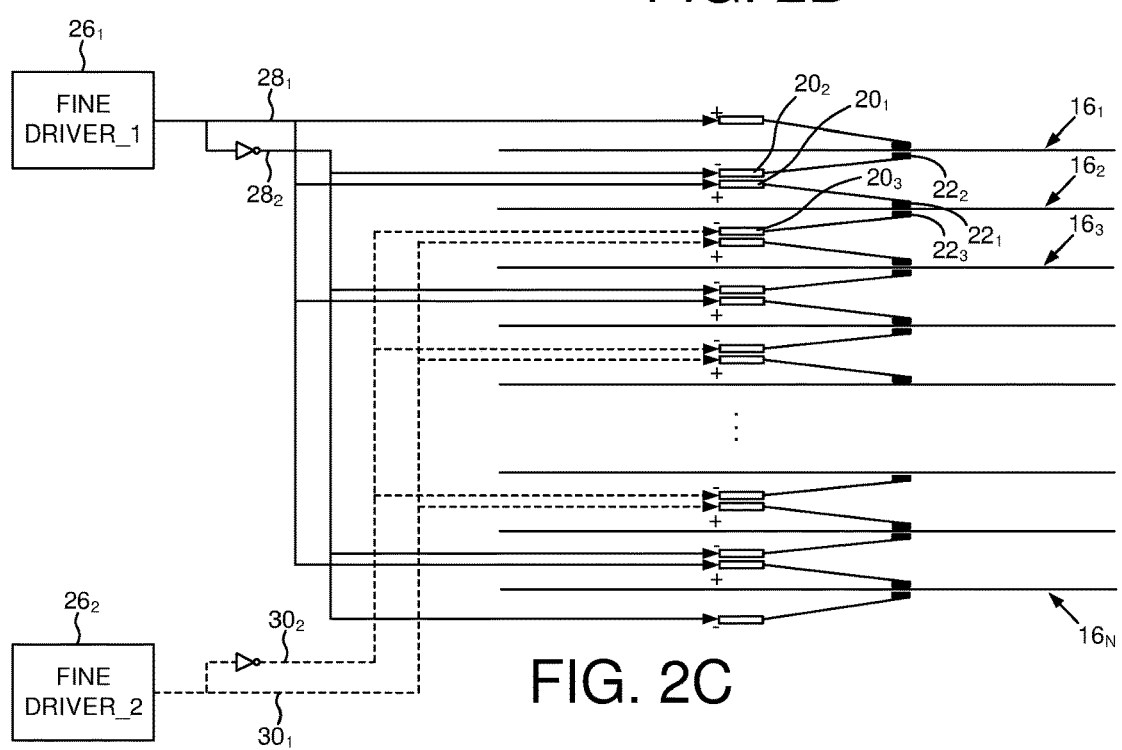
FIG. 2C shows an embodiment wherein a first fine driver applies positive/negative control signals to the fine actuators of an even interleave of the actuator arms and a second fine driver applies positive/negative control signals to the fine actuators of an odd interleave of the actuator arms.

FIGS. 2A and 2B show a data storage device in the form of a disk drive according to an embodiment comprising a plurality of disks $16_1$-$16_N$ each comprising a top disk surface and a bottom disk surface. A plurality of actuator arms (e.g., actuator arm 18) each comprise a first fine actuator (e.g., fine actuator $20_1$) configured to actuate a top head (e.g., top head $22_1$) over one of the top disk surfaces and a second fine actuator (e.g., fine actuator $20_2$) configured to actuate a bottom head (e.g., bottom head $22_2$) over one of the bottom disk surfaces. A coarse actuator (e.g., VCM 24) is configured to concurrently move the actuator arms to actuate the heads over their respective disk surface as shown in FIG. 2B. FIG. 2C shows an embodiment wherein a first driver $26_1$ is configured to apply a first control signal $28_1$ to the first fine actuators of an even interleave of the actuator arms, and apply a second control signal $28_2$ to the second fine actuators of the even interleave of the actuator arms, wherein the second control signal having an opposite polarity of the first control signal. A second driver $26_2$ is configured to apply a third control signal $30_1$ to the first fine actuators of an odd interleave of the actuator arms, and apply a fourth control signal $30_2$ to the second fine actuators of the odd interleave of the actuator arms, wherein the fourth control signal having an opposite polarity of the third control signal.

Figure 1:
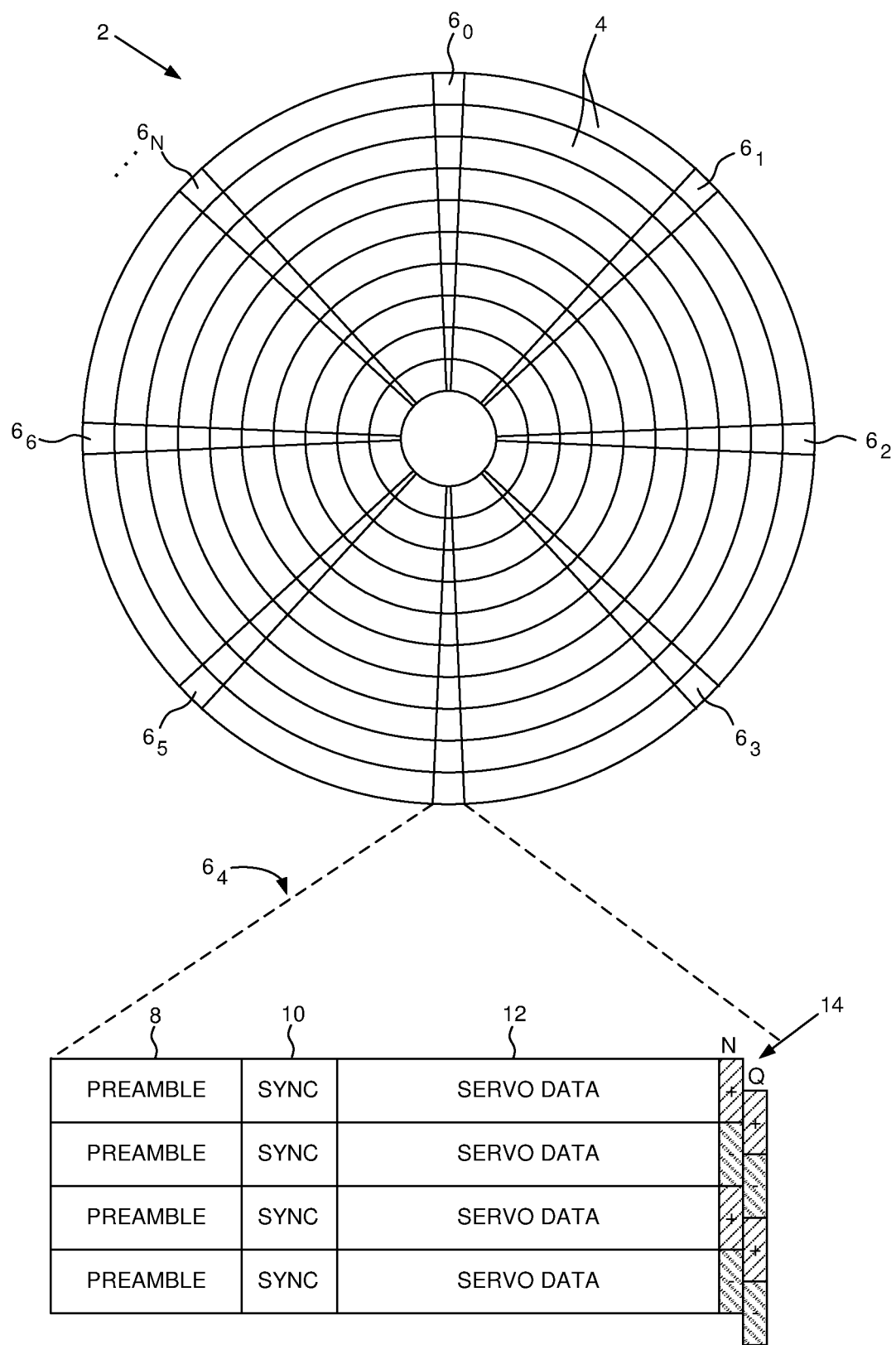
FIG. 1 shows a prior art disk format comprising a plurality of servo tracks defined by servo sectors.

In the embodiment of FIG. 2A, the disk drive comprises control circuitry 32 configured to process read signals 34 emanating from the heads to demodulate servo sectors and generate a position error signal (PES) representing an error between the actual position of a head and a target position relative to a target data track. A servo control system in the control circuitry 32 filters the PES using a suitable compensation filter to generate a control signal 36 applied to the VCM 24 which rotates the actuator arms about a pivot in order to actuate the head radially over the disk in a direction that reduces the PES. The heads are also servoed using a fine actuator, such as a piezoelectric (PZT) actuator, configured to actuate a suspension relative to the actuator arm as shown in FIG. 2B, and/or configured to actuate the head relative to the suspension. The servo sectors may comprise any suitable head position information, such as a track address for coarse positioning and servo bursts for fine positioning. In one embodiment, the servo bursts may comprise any suitable pattern wherein at least one servo burst consists of a periodic sequence of magnetic transitions, such as an amplitude based servo pattern or a phase based servo pattern (FIG. 1).

In one embodiment, the control circuitry 32 is configured to concurrently access two disk surfaces using the respective fine actuators and heads (e.g., a concurrent write or read operation). In this embodiment, the control circuitry 32 controls the VCM 24 to position the two heads at a DC offset relative to the two disk surfaces, and controls the fine drivers $26_1$ and $26_2$ to position the heads at respective AC offsets based on the PES of each head (i.e., the off-track error from the centerline of the target data tracks). Referring again to FIG. 2C, each fine driver $26_1$ and $26_2$ controls the fine actuators of a respective bank of actuator arms. In addition, each fine driver $26_1$ and $26_2$ controls the fine actuator for the top and bottom heads of a respective actuator arm by driving the fine actuators with opposite polarity control signals in order to attenuate a vibration mode of the actuator arms. In one embodiment, the vibration mode of the actuator arms may be further attenuated by interleaving the control signals corresponding to even/odd banks of actuator arms such as shown in FIG. 2C. That is, the positive/negative control signals $28_1$ and $28_2$ of the first fine driver $26_1$ are applied to the fine actuators of a first actuator arm, the positive/negative control signals $30^1$ and $30_2$ of the second fine driver $26_2$ are applied to the fine actuators of the next actuator arm, and so on, so as to interleave the positive/negative control signals.

Figure 3:
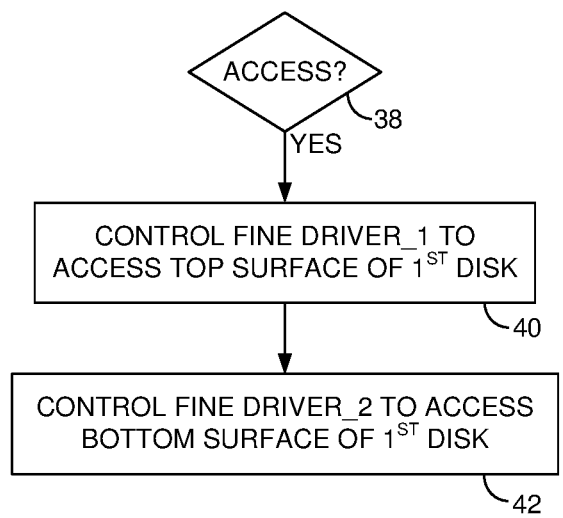
FIG. 3 is a flow diagram according to an embodiment wherein a top disk surface and a bottom disk surface of a disk are accessed concurrently by controlling the respective fine actuators using the first and second fine actuators.

In one embodiment when concurrently accessing two disk surfaces, the radial offset between the data tracks of each disk surface may be smallest when accessing the disk surfaces (top and bottom) of the same disk as compared to accessing disk surfaces of different disks. Referring again to FIG. 2C and the flow diagram of FIG. 3, when concurrently accessing the top/bottom disk surfaces of disk $16_2$ (block 38), the first fine driver $26_1$ controls fine actuator $20_1$ (using the positive control signal $28_1$) in order to servo head $22_1$ over the top disk surface of disk $16_2$ (block 40). The second fine driver $26_2$ concurrently controls fine actuator $20_3$ (using the negative control signal $30_2$) in order to servo head $22_3$ over the bottom disk surface of disk $16_2$ (block 42). In this embodiment, applying the fine driver control signals to the fine actuators of interleaved even/odd banks of actuator arms such as shown in FIG. 2C enables the concurrent access of top/bottom disk surfaces of the same disk. In other embodiments, a top or bottom disk surface of different disks may be accessed concurrently, such as accessing the top disk surface of disk $16_2$ using the first fine driver $26_1$, and accessing the top disk surface of disk $16_3$ using the second fine driver $26_2$. In yet another embodiment, the relative radial offsets of the data tracks across the disk surfaces may be measured, and the disk surfaces may be grouped into pairs so that the radial offset between the data tracks of each pair is minimized.

Referring again to the embodiment of FIG. 2C, a top head is actuated over the top disk surface of the top disk $16_1$, and a bottom head is actuated over the bottom disk surface of the bottom disk $16_N$. In this embodiment, the first fine driver $26_1$ controls the fine actuator of the top head using the positive control signal $28_1$ and controls the fine actuator of the bottom head using the negative control signal $28_2$. In an alternative embodiment, the fine actuators for the top/bottom heads may be controlled by the second fine driver $26_2$ using the positive/negative control signals $30_1$ and $30_2$. In this manner, the vibration mode of the actuator arms is attenuated by driving two fine actuators with control signals of opposite polarity.

In the embodiment of FIG. 2C, the negative polarity control signals $28_2$ and $30_2$ are shown as being generated by inverting the corresponding positive polarity control signals $28_1$ and $30_1$. However, the analog inverter shown in FIG. 2C merely indicates that in one embodiment the control signals generated by each fine driver have oppositive polarity. In other embodiments, the positive/negative polarity control signals may be generated in any other suitable manner, such as by using a non-inverting amplifier and an inverting amplifier with equal gains.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power circuit(s) and/or a suitable preamp circuit(s) implemented as separate integrated circuits, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a plurality of disks each comprising a top disk surface and a bottom disk surface;
   a plurality of actuator arms each comprising a first fine actuator configured to actuate a top head over one of the top disk surfaces and a second fine actuator configured to actuate a bottom head over one of the bottom disk surfaces;
   a coarse actuator configured to concurrently move the actuator arms to actuate the top and bottom heads over respective top and bottom disk surfaces;

a first driver configured to drive the first and second fine actuators of an even interleave of the actuator arms, wherein the first driver is configured to:
  apply a first control signal to the first fine actuators of the even interleave of the actuator arms, and
  apply a second control signal to the second fine actuators of the even interleave of the actuator arms, the second control signal having an opposite polarity of the first control signal; and
a second driver configured to drive the first and second fine actuators of an odd interleave of the actuator arms independent of the first driver driving the first and second fine actuators of the even interleave of the actuator arms, wherein the second driver is configured to:
  apply a third control signal to the first fine actuators of the odd interleave of the actuator arms, and
  apply a fourth control signal to the second fine actuators of the odd interleave of the actuator arms, the fourth control signal having an opposite polarity of the third control signal.

2. The data storage device as recited in claim 1, wherein driving the first and second fine actuators of interleaved actuator arms using the first and second drivers attenuates a vibration mode of the actuator arms.

3. The data storage device as recited in claim 1, further comprising control circuitry configured to:
  control the first driver based on first servo data read from a top disk surface of a first disk in order to access the top disk surface of the first disk using the respective top head; and
  control the second driver based on second servo data read from a bottom disk surface of the first disk in order to access the bottom disk surface of the first disk surface using the respective bottom head.

4. The data storage device of claim 1, wherein the second control signal is generated by inverting the first control signal, and the fourth control signal is generated by inverting the third control signal.

5. The data storage device of claim 4, wherein the inversion is conducted using an analog converter.

6. The data storage device of claim 4, wherein the inversion is conducted using a non-inverting amplifier having a first gain and an inverting amplifier having a second gain equal to the first gain.

7. The data storage device of claim 1, further comprising control circuitry configured to:
  access the top disk surface of a first disk using the top head coupled to the second fine actuator of a first actuator arm of the even interleave; and
  concurrently with the accessing of the top disk surface of the first disk, access the bottom disk surface of the first disk using the bottom head coupled to the first fine actuator of a first actuator arm of the odd interleave.

8. The data storage device of claim 7, wherein the control circuitry is further configured to:
  access the top disk surface of a second disk using the top head coupled to the second fine actuator of the first actuator arm of the odd interleave; and
  concurrently with the accessing of the top disk surface of the second disk, access the bottom disk surface of the second disk using the bottom head coupled to the first fine actuator of a second actuator arm of the even interleave.

9. Control circuitry comprising:
a first driver configured to drive a first fine actuator and a second fine actuator of each actuator arm of an even interleave of a plurality of actuator arms, wherein the first driver is configured to:
  apply a first control signal to the first fine actuators of the even interleave of the actuator arms; and
  apply a second control signal to the second fine actuators of the even interleave of the actuator arms, the second control signal having an opposite polarity of the first control signal; and
a second driver configured to drive a first fine actuator and a second fine actuator of each actuator arm of an odd interleave of the actuator arms independent of the first driver driving the first and second fine actuators of the even interleave of the actuator arms, wherein the second driver is configured to:
  apply a third control signal to the first fine actuators of the odd interleave of the actuator arms; and
  apply a fourth control signal to the second fine actuators of the odd interleave of the actuator arms, the fourth control signal having an opposite polarity of the third control signal.

10. The control circuitry of claim 9, wherein the second control signal is generated by inverting the first control signal, and the fourth control signal is generated by inverting the third control signal.

11. The control circuitry of claim 10, wherein the inversion is conducted using an analog converter.

12. The control circuitry of claim 10, wherein the inversion is conducted using a non-inverting amplifier having a first gain and an inverting amplifier having a second gain equal to the first gain.

13. The control circuitry of claim 9, wherein the control circuitry is configured to:
  access a top disk surface of a first disk using a head coupled to the second fine actuator of a first actuator arm of the even interleave; and
  concurrently with the accessing of the top disk surface of the first disk, access a bottom disk surface of the first disk using a head coupled to the first fine actuator of a first actuator arm of the odd interleave.

14. The control circuitry of claim 13, wherein the control circuitry is further configured to:
  access a top disk surface of a second disk using a head coupled to the second fine actuator of the first actuator arm of the odd interleave; and
  concurrently with the accessing of the top disk surface of the second disk, access a bottom disk surface of the second disk using a head coupled to the first fine actuator of a second actuator arm of the even interleave.

15. Control circuitry comprising:
a first means for driving a first fine actuator and a second fine actuator of each actuator arm of an even interleave of a plurality of actuator arms, the first means comprising:
  a means for applying a first control signal to the first fine actuators of the even interleave of the actuator arms, and
  a means for applying a second control signal to the second fine actuators of the even interleave of the actuator arms, the second control signal having an opposite polarity of the first control signal; and
a second means for driving a first fine actuator and a second fine actuator of each actuator arm of an odd interleave of the actuator arms independent of the first driver means driving the first and second fine actuators of the even interleave of the actuator arms, the second means comprising:

a means for applying a third control signal to the first fine actuators of the odd interleave of the actuator arms, and a means for applying a fourth control signal to the second fine actuators of the odd interleave of the actuator arms, the fourth control signal having an opposite polarity of the third control signal.

16. The control circuitry of claim 15, wherein the second control signal is generated by inverting the first control signal, and the fourth control signal is generated by inverting the third control signal.

17. The control circuitry of claim 16, wherein the inversion is conducted using an analog converter.

18. The control circuitry of claim 16, wherein the inversion is conducted using a non-inverting amplifier having a first gain and an inverting amplifier having a second gain equal to the first gain.

19. The control circuitry of claim 15, wherein the control circuitry is configured to:

access a top disk surface of a first disk using a head coupled to the second fine actuator of a first actuator arm of the even interleave; and concurrently with the accessing of the top disk surface of the first disk, access a bottom disk surface of the first disk using a head coupled to the first fine actuator of a first actuator arm of the odd interleave.

20. The control circuitry of claim 19, wherein the control circuitry is further configured to:

access a top disk surface of a second disk using a head coupled to the second fine actuator of the first actuator arm of the odd interleave; and concurrently with the accessing of the top disk surface of the second disk, access a bottom disk surface of the second disk using a head coupled to the first fine actuator of a second actuator arm of the even interleave.

* * * * *